(12) United States Patent
Ishii (10) Patent No.: US 8,359,034 B2
(45) Date of Patent: Jan. 22, 2013

(54) MOBILE COMMUNICATION SYSTEM, BASE STATION APPARATUS, USER EQUIPMENT AND METHOD

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 245 days.

(21) Appl. No.: 12/746,221

(22) PCT Filed: Dec. 3, 2008

(86) PCT No.: PCT/JP2008/071963
§ 371 (c)(1),
(2), (4) Date: Jul. 8, 2010

(87) PCT Pub. No.: WO2009/072521
PCT Pub. Date: Nov. 6, 2009

(65) Prior Publication Data
US 2010/0273484 A1    Oct. 28, 2010

(30) Foreign Application Priority Data

Dec. 4, 2007   (JP) ................................. 2007-313964

(51) Int. Cl.
*H04W 36/00* (2009.01)
(52) U.S. Cl. .......................... 455/436; 455/437; 455/438
(58) Field of Classification Search .......... 370/331–333; 455/422.1, 436–444
See application file for complete search history.

(56) References Cited

U.S. PATENT DOCUMENTS

| 2008/0076427 | A1* | 3/2008 | Huang et al. | 455/436 |
| 2008/0189970 | A1* | 8/2008 | Wang et al. | 33/701 |
| 2008/0274742 | A1* | 11/2008 | Bi | 455/437 |
| 2008/0318577 | A1* | 12/2008 | Somasundaram et al. | 455/436 |
| 2009/0092056 | A1* | 4/2009 | Kitazoe | 370/252 |
| 2011/0182247 | A1* | 7/2011 | Chun et al. | 370/329 |

FOREIGN PATENT DOCUMENTS

| EP | 1 986 347 A1 | 10/2008 |
| WO | 2007/091677 A1 | 8/2007 |

OTHER PUBLICATIONS

Panasonic, "Measurement Gap Control Functionality," 3GPP TSG RAN WG2 #59-bis, R2-074155; Oct. 8-12, 2007, 5 pages.

(Continued)

*Primary Examiner* — Ajit Patel
(74) *Attorney, Agent, or Firm* — Osha Liang LLP (57) ABSTRACT

A base station apparatus includes a determination unit configured to determine whether to cause a user equipment residing in a cell of the base station apparatus to conduct different frequency measurement and a transmitting unit configured to transmit a control signal to the user equipment. The user equipment includes a reception unit configured to receive the control signal from the base station apparatus of a camped cell and a cell search and quality measurement unit configured to conduct cell search at a frequency indicated by the base station apparatus and cell quality measurement. If a candidate handover target cell of the user equipment is a predefined cell, the control signal allows the user equipment to conduct the different frequency measurement in a gap period defined in a mobile communication system. If the candidate handover target cell of the user equipment is another predefined cell different from the predefined cell, the control signal allows the user equipment to conduct the different frequency measurement in the gap period defined in the mobile communication system and between discontinuous signal receptions in a discontinuous reception operating mode.

20 Claims, 7 Drawing Sheets

OTHER PUBLICATIONS

NTT DoCoMo, Inc., "Measurement gap control," 3GPP TSG RAN WG2 #59, Tdoc R2-073369, Aug. 20-24, 2007, 5 pages.

3GPP TS 25.331 V6.14.0, "Radio Resource Control (RRC); Protocol Specification," Jun. 2007, 1247 pages.

International Search Report issued in PCT/JP2008/071963, mailed on Jan. 13, 2009, with translation, 8 pages.

Written Opinion issued in PCT/JP2008/071963, mailed on Jan. 13, 2009, 3 pages.

\* cited by examiner

MOBILE COMMUNICATION SYSTEM, BASE STATION APPARATUS, USER EQUIPMENT AND METHOD

TECHNICAL FIELD

The present invention relates to the technical field of mobile communications and particularly relates to mobile communication systems, base station apparatuses, user equipments and methods for supporting handover between different frequency systems.

BACKGROUND ART

In general, a user equipment (UE) or user apparatus measures quality of adjacent cells being handover target candidates and reports the measurement result to a base station in advance of handover (HO). The quality may be represented by reception level or reception SINR of a reference signal, for example. The reporting to the base station (eNB) is carried out through measurement reports. Based on the measurement report, the base station determines whether the user equipment UE is to initiate the handover and transmits a handover instruction message as a handover command to the user equipment UE.

The handover target may be not only a cell having the same frequency in the same system but also a cell having a different frequency in the same system. Alternatively, the handover target may be a cell where a different radio access technology (RAT) is employed. The frequency of the cell using such a different radio access technology may be typically different from that of the handover source. Thus, the frequency of the handover target cell may be necessarily different from that of the handover source cell.

Figure 1:
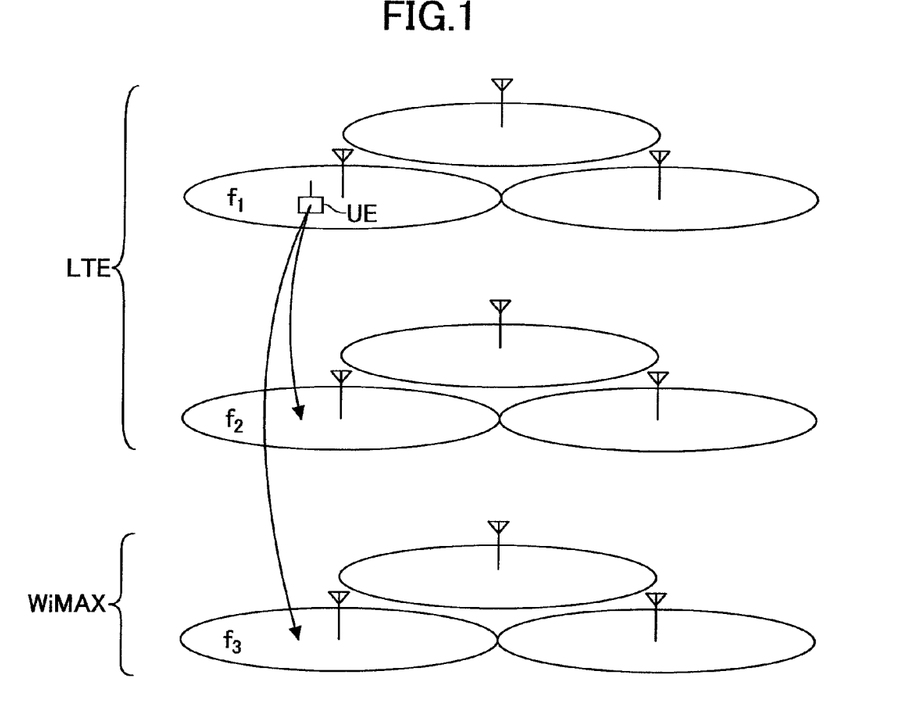
FIG. 1 schematically illustrates exemplary different frequency/different RAT handover.

FIG. 1 schematically illustrates exemplary handover between different frequency cells. In FIG. 1, a LTE (Long Term Evolution) based system including a mobile communication system having a first frequency $f_1$ and a mobile communication system having a second frequency $f_2$ and a WiMAX based system using a frequency $f_3$ different from these frequencies are illustrated. Handover between different frequency systems or different RAT systems may be described in a version of 3GPP TS25.331 at filing the present application, for example.

Meanwhile, a user equipment (UE) typically has one radio frequency signal processing unit and accordingly cannot transmit or receive signals to/from the different frequency systems simultaneously. For this reason, in order to measure a cell (different frequency cell) having a frequency different from that of a camped cell (serving cell), the user equipment must perform frequency resynchronization. Specifically, the base station (eNB) indicates a length of a gap period, an arrival cycle of the gap period, a frequency of a different frequency cell or others to the user equipment (UE) through RRC measurement control. The user equipment (UE) conducts different frequency measurement, including change in frequencies, following synchronization channels, quality measurements or others, during the indicated gap period. The term "different frequency measurement" used herein includes not only searching for different frequency cells and measuring the quality but also searching for different RAT cells and measuring the quality.

Figure 2:
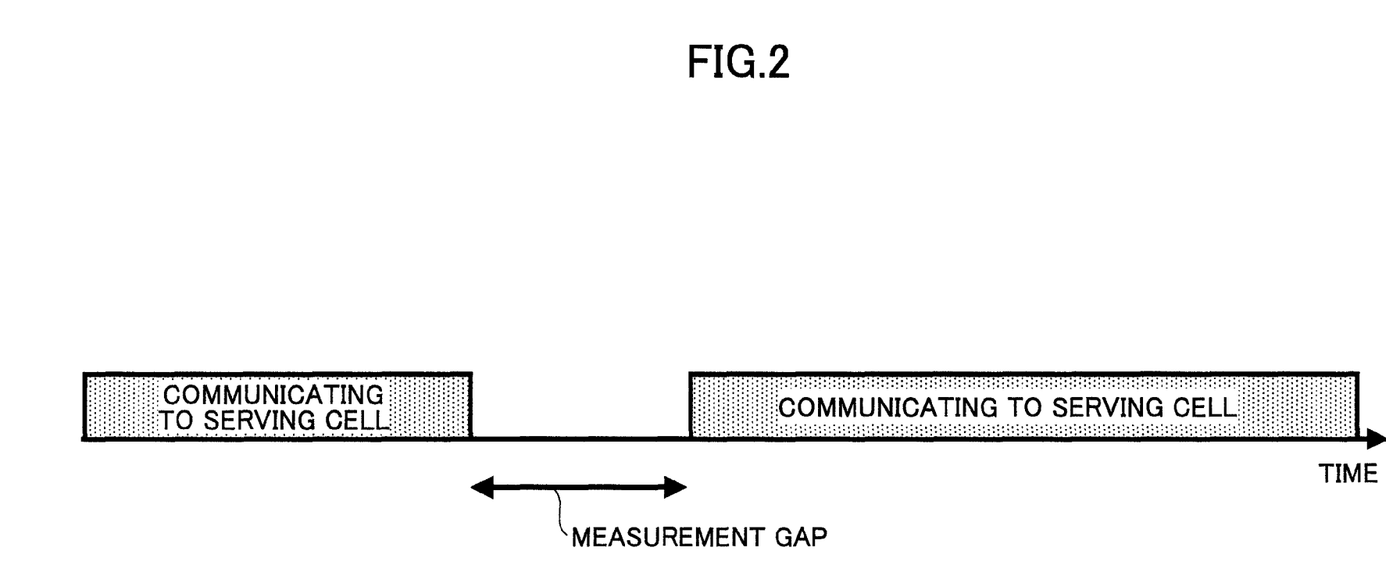
FIG. 2 schematically illustrates exemplary gaps in communications.

FIG. 2 schematically illustrates exemplary gap periods in communications at a serving cell.

In order to realize rapid handover to a different frequency cell, different frequency measurement must be efficiently and rapidly conducted ahead of the handover. For this reason, it is desired to specify an operating pattern of the user equipment during the gap period as strictly as possible and optimize a specific manner of the different frequency measurement. Such an operating pattern highly depends on the length of the gap period in the camped cell and transmission frequencies of synchronization channels, pilot signals, broadcast information and others in the handover target. Thus, in order to optimize the different frequency measurement method, it is desirable to predetermine how the user equipment needs to operate corresponding to envisaged different situations depending on the length of the gap period in the camped cell and transmission frequencies of synchronization channels, pilot signals, broadcast information and others in the handover target. If it can be predetermined how the user equipment needs to operate in this manner, the different frequency measurement can be rapidly completed.

Meanwhile, handover target systems typically possess their own specific transmission periodicities of the synchronization channels, the pilot signals and the broadcast information. This means that the handover target systems may have different optimum lengths of the gap period. In other words, a camped cell may need kinds of different gap period corresponding to the number of potential handover target systems. In this case, however, the user equipment might have to optimize the different frequency measurement corresponding to the kinds of gap periods, resulting in complication of the user equipment and higher design costs. Furthermore, it would have to be guaranteed that the user equipment operates to conduct the optimum different frequency measurements for all the gap periods, resulting in heavier workloads on operation tests for the user equipment.

On the other hand, although it is desirable to apply a single type of gap period for any handover target system, it is hard to define the optimum single gap period for existing radio communication systems and future radio communication systems.

DISCLOSURE OF INVENTION

Problem to be Solved by the Invention

One object of the present invention is to reduce design workload of user equipments having the capability of conducting handover to different frequency cells and workload on operation tests of the user equipments.

Means for Solving the Problem

In one aspect of the present invention, a mobile communication system including a base station apparatus and a user equipment is used. The base station apparatus includes a determination unit configured to determine whether to cause a user equipment residing in a cell of the base station apparatus to conduct different frequency measurement and a transmitting unit configured to transmit a control signal to the user equipment. The user equipment includes a reception unit configured to receive the control signal from a base station apparatus of a camped cell and a cell search and quality measurement unit configured to conduct cell search at a frequency indicated by the base station apparatus and cell quality measurement. If a candidate handover target cell of the user equipment is a predefined cell, the control signal indicates to the user equipment to conduct the different frequency measurement in a gap period defined in the mobile communication system. If the candidate handover target cell of the user equipment is another predefined cell different from the predefined cell, the control signal indicates to the user equipment to conduct the different frequency measurement and enter a discontinuous reception operating mode in the gap period defined in the mobile communication system.

Advantage of the Invention

According to the aspect of the present invention, it is possible to reduce design workload of user equipments having the capability of conducting handover to different frequency cells and workload on operation tests of the user equipments.

LIST OF REFERENCE SYMBOLS

200: base station apparatus
202: transmit and receive antenna
204: amplification unit
206: transmitting and receiving unit
208: baseband signal processing unit
210: call processing unit
212: channel interface
71: receiving unit
72: FFT processing unit
73: channel decoding unit
74: measurement unit
75: gap control unit
76: DRX control unit

BEST MODE FOR CARRYING OUT THE INVENTION

A base station apparatus according to one embodiment of the present invention includes a determination unit configured to determine whether to cause a user equipment residing in an own cell and a transmitting unit configured to transmit a control signal to the user equipment. If a candidate handover target cell of the user equipment is a predefined cell, the control signal indicates to the user equipment to conduct different frequency measurement in a gap period defined in a mobile communication system. If the candidate handover target cell of the user equipment is another predefined cell different from the predefined cell, the control signal indicates to the user equipment to conduct the different frequency measurement in the gap period defined in the mobile communication system and between discontinuous receptions in a discontinuous reception (DRX) operating mode.

The predefined cell may be a different frequency cell in the serving system or a cell in a system different from the serving system.

More specifically, assuming that the serving system complies with E-UTRA, the predefined cell may be a different frequency cell in the E-UTRA system, a cell in a UTRA system or a cell in a GSM system, for example. Also, another predefined cell different from the predefined cell may be a cell in a WiMAX system, a CDMA 2000 system or a E-UTRA TDD system, for example. The E-UTRA system means a LTE (Long Term Evolution) based system, and the UTRA system means a WCDMA based system.

If the candidate handover target cell of the user equipment is another predefined cell different from the predefined cell, an indication to enter the discontinuous reception operating mode and an indication to conduct the different frequency measurement may be represented in separate control signals. This is preferable in that the present invention can be implemented without modifying definitions of existing signals.

The separate control signals may be a RRC message or MAC layer control information, for example. More specifically, the indication to enter the discontinuous reception operating mode and the indication to conduct the different frequency measurement may be represented in separate RRC messages. Alternatively, the indication to enter the discontinuous reception operating mode and the indication to conduct the different frequency measurement may be represented in separate MAC layer control information elements. Alternatively, the indication to enter the discontinuous reception operating mode may be represented in a RRC message, and the indication to conduct the different frequency measurement may be represented in MAC layer control information. Alternatively, the indication to enter the discontinuous reception operating mode may be represented in MAC layer control information, and the indication to conduct the different frequency measurement may be represented in a RRC message.

If the candidate handover target cell of the user equipment is another predefined cell different from the predefined cell, the indication to enter the discontinuous reception operating mode and the indication to conduct the different frequency measurement may be represented in the same control signal. This is preferable due to reduction in control signaling amounts.

The separate control signals may be a RRC message or MAC layer control information, for example. More specifically, the indication to enter the discontinuous reception operating mode and the indication to conduct the different frequency measurement may be represented in a single RRC message. Alternatively, the indication to enter the discontinuous reception operating mode and the indication to conduct the different frequency measurement may be represented in a single MAC layer control information element.

If the candidate handover target cell of the user equipment is another predefined cell different from the predefined cell, it may be prevented to assign radio resources to the user equipment, and the operating mode of the user equipment may move to the discontinuous reception operating mode without the base station apparatus providing an explicit instruction to the user equipment. In other words, if the candidate handover target cell of the user equipment is another predefined cell different from the predefined cell, the base station apparatus may refrain from transmitting a DL Scheduling Information signal for assigning downlink resources to the user equipment and a UL Scheduling Grant signal for assigning uplink resources to the user equipment to switch the operating mode of the user equipment to the discontinuous reception operating mode. This is preferable due to reduction in control signaling amounts. The DL Scheduling Information may be referred to as DL Scheduling Grant and DL Assignment Information. Also, the DL Scheduling Information and the UL Scheduling Grant may be collectively referred to as Downlink Scheduling Information (DCI). Also, a DCI mapped physical channel may be a PDCCH (Physical Downlink Control Channel).

As stated above, the control signal is a RRC message or MAC layer control information. The RRC message may be a RRC measurement control, for example. Also, the MAC layer control information may be a MAC control block, for example. Alternatively, instead of the MAC layer control information, MAC layer header information may be used. Alternatively, the MAC layer control information may be referred to as a MAC control element, for example.

Among the control signals, the control signal for indicating the different frequency measurement may indicate a length and an arrival cycle of the gap period and a frequency for the different frequency measurement.

Among the control signals, the control signal for indicating transition to the discontinuous reception mode may indicate a cycle of the discontinuous reception and a length of On-duration. The discontinuous reception period means a cycle of reception timings in the discontinuous reception mode. Also, the On-duration length means a reception period. For example, assuming the discontinuous reception cycle 40 ms and the On-duration length 3 ms, the user equipment would conduct reception every 40 ms for three successive subframes. One subframe corresponds to 1 ms.

Alternatively, in the control signals, the discontinuous reception cycle, the On-duration length and others may be indicated in the RRC message, and only the indication to enter the discontinuous reception mode may be indicated in the MAC layer control information.

The non-reception period of the discontinuous reception operating mode may be longer than the gap period.

In one embodiment of the present invention, a user equipment is used. The user equipment includes a reception unit configured to receive a control signal from a base station apparatus of a camped cell and a cell search and quality measurement unit configured to conduct cell search at a frequency indicated by the base station apparatus and measure quality of the detected cell. The target cell for the cell search and quality measurement may be in the same system as the serving system or in another system different from the serving system. In accordance with the control signal, the user equipment (a) conducts the different frequency measurement in the gap period defined in the mobile communication system or (b) conducts the different frequency measurement in the gap period defined in the mobile communication system or between discontinuous signal receptions in the discontinuous reception operating mode.

For convenience, specific numerical values are used in the present description in order to facilitate understandings of the present invention. However, unless specifically stated otherwise, these numerical values are illustrative, and any other value may be used.

First Embodiment

[Operation Principle]

In one embodiment of the present invention, a single type of gap period (e.g., 6 ms) is defined in a system. More generally, the present invention is not necessarily limited to the single type of gap period, but the limitation to the single type of gap period can realize the greatest reduction in workload on operation tests of a user equipment. For efficient different frequency measurement during the gap period, the measurement method is optimized, and all user equipments must be able to conduct the optimized different frequency measurement. For convenience, it is assumed that a user equipment resides in a cell of a LTE based system using one type of gap period (6 ms) and is to initiate handover to a WiMAX based system using a different frequency. For the handover to the WiMAX based system, that is, for different frequency measurement for a WiMAX based cell, it is generally considered to be the best to conduct the different frequency measurement under the gap period corresponding to about 10 ms. Note that the present invention is not limited to the specific system and may be applied to any other appropriate system that needs the different frequency measurement. For example, the handover may be conducted between a LTE based system using one frequency and a LTE based system using another frequency. Also, the handover may be conducted between a LTE based system and a WCDMA (UTRA-FDD) based system. In addition, the handover may be conducted between a LTE based system and a GSM based system. In the above-mentioned handover, the same gap period (e.g., 6 ms) may be applied.

On the other hand, as exemplary handover between systems having different gap periods, there are handover between a LTE based system and a WiMAX based system as well as handover between a LTE system complying with a non-TDD scheme and a LTE based system complying with a TDD scheme. These are simply illustrative, and the present invention may be applied to handover between any other appropriate systems.

In one embodiment of the present invention, when a base station apparatus confirms that a candidate handover target system of a user equipment UE corresponds to a WiMAX based system, the operating mode of the user equipment is switched to a discontinuous reception operating mode (DRX mode), and different frequency measurement is conducted between the discontinuous receptions. The different frequency measurement may not be the optimized measurement method. The different frequency measurement only has to be conducted within the periods.

The DRX mode is set for battery energy savings of the user equipment in nature. For example, if the user equipment UE has not communicated in a shared data channel for longer than or equal to a predefined time period, the operating mode of the user equipment UE may be switched from a non-DRX mode to the DRX mode. On the other hand, when uplink or downlink communications must be initiated, the operating mode is switched from the DRX mode to the non-DRX mode. In this embodiment, the whole or a part of a time period between the discontinuous receptions occurring under the DRX mode is applied to a period for the different frequency measurement.

Figure 3:
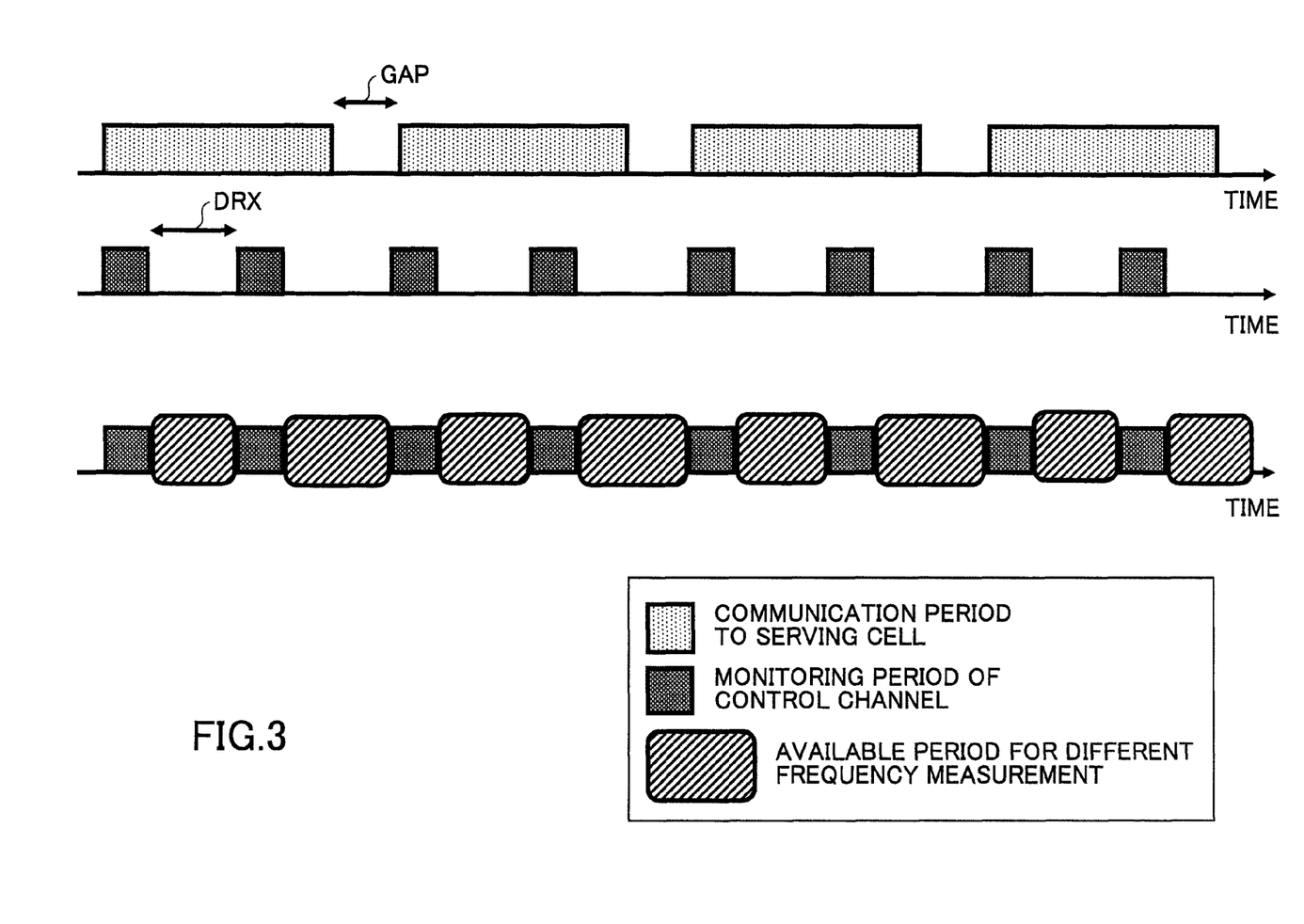
FIG. 3 illustrates periods available for different frequency measurement.

In the upper stage of FIG. 3, it is illustrated that gap periods are provided between communications of the user equipment UE to a serving cell. This illustration substantially corresponds to FIG. 2. The different frequency measurement is conducted during the gap periods in an optimized manner. In the middle stage of FIG. 3, it is illustrated that the user equipment UE receives control channels discontinuously in the DRX mode.

In the lower stage of FIG. 3, it is illustrated that the different frequency measurement is conducted between discontinuous receptions of the control signals in the DRX mode according to one embodiment of the present invention. According to this embodiment, only one type of gap period must be defined in a LTE based system beforehand, which can reduce operation patterns in the different frequency measurement guaranteed by the user equipment UE. Handover to a different frequency cell according to the present embodiment may be slightly delayed in that the different frequency measurement is conducted in a non-optimized measurement manner in handover to a WiMAX based system (or cell). However, the present embodiment can maintain a higher accuracy of identifying a handover target than the case where the different frequency measurement is conducted in the WiMAX based system by using the same gap period (6 ms) as that of the LTE based system.

If the candidate handover target system for the user equipment UE corresponds to a UTRA based system, that is, a WCDMA based system, the user equipment UE may use only the gap period of 6 ms to conduct cell searches and measure quality of the detected cell independent of the user equipment being or not being in the DRX mode.

[Operation Flow]

Figure 4:
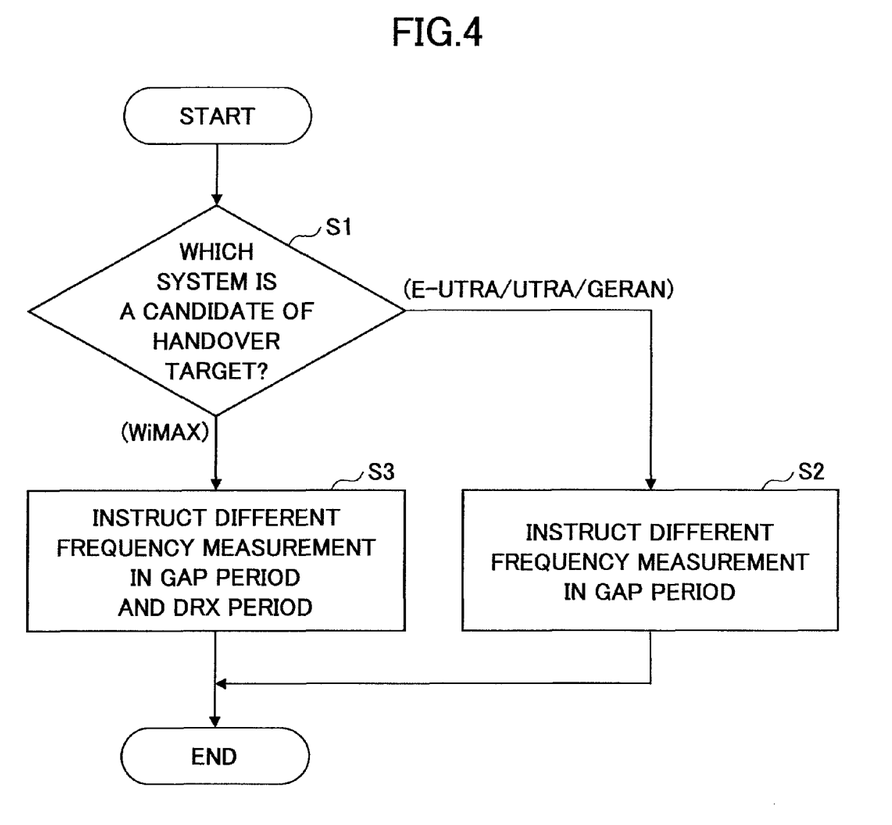
FIG. 4 is a flowchart illustrating an exemplary operation of a base station apparatus.

FIG. 4 illustrates an operation flow of a base station apparatus according to one embodiment of the present invention. At step S1, it is determined whether a candidate handover target of a user equipment UE presently residing in a LTE based system corresponds to a predefined system. In this embodiment, the predefined system is a WiMAX based system. More generally, in the case where the gap period is 6 ms in length, the predefined system may be a different frequency system having an optimum gap period different from 6 ms for the different frequency measurement. If the candidate handover target corresponds to a LTE (E-UTRA) based system, a WCDMA (UTRA) based system or a GSM (GERAN) based system, the flow proceeds to step S2.

At step S2, it is determined that the gap period of 6 ms specified in the system is provided in communications in the camped cell. Then, the user equipment is notified that the different frequency measurement is to be conducted. At this time point or other time points, the base station apparatus eNB transmits the length of the gap period, an arrival cycle of the gap period, a different frequency to be measured and/or others to the user equipment UE in some control signals. The other time point may be a connection setup time. The control signals may be messages such as RRC measurement control or other messages.

Step S3 corresponds to the case where the candidate handover target at step S1 is the predefined system such as a WiMAX based system. In the different frequency measurement for cells in the WiMAX based system, the optimum gap period is considered to be 10 ms, which differs from the gap period (6 ms) specified for the LTE system. For this reason, there is a likelihood that the different frequency measurement cannot be satisfactorily conducted for the gap period of 6 ms as provided at step S2. Thus, at step S3, the base station apparatus eNB changes the operating mode of the user equipment UE into the discontinuous reception operating mode (DRX mode) and allows the different frequency measurement to be conducted in both the gap period and a period between discontinuous receptions (DRX period, that is, a period other than On-duration in the discontinuous reception control). The DRX period may be considered to be a period not being active time in the discontinuous reception control.

The base station apparatus eNB notifies the user equipment UE to transition to the DRX mode and conduct the different frequency measurement at step S3. At the time point when the user equipment UE is notified to conduct the different frequency measurement or at other time points, the base station apparatus eNB transmits the length of the gap period, an arrival cycle of the gap period, a different frequency to be measured and/or others to the user equipment UE in some control signals. The other time point may be a connection setup time. The control signals may be messages such as RRC measurement control or other messages.

Some methods as presented below may be conceived for the notification at step S3 without limitation to them.

(Method 1)

The instructions to the user equipment UE on the transition to the DRX mode and the initiation of the different frequency measurement are represented in separate control signals, and the separate control signals are transmitted to the user equipment UE in an explicit manner. For example, the instruction on the transition to the DRX mode may be represented in header information or control information in a MAC layer or RRC messages. For the DRX mode, the discontinuous period for the discontinuous reception, On-duration timer, a duty ratio, a DRX cycle and others may be specified at this time point. Alternatively, the discontinuous period and others may be uniquely specified in the system. In this embodiment, the optimum gap period for the different frequency measurement in the WiMAX system is 10 ms, and accordingly the DRX period is preferably specified to be longer than or equal to 10 ms at this time point. The instruction on the initiation of the different frequency measurement may be represented in RRC messages such as RRC measurement control. For the different frequency measurement, the user equipment UE is notified at least of which cell frequency is to be searched for.

According to this method, existing signals can be used for the control signal for signaling the transition to the DRX mode and the control signal for signaling the initiation of the different frequency measurement, which is advantageous in that new signals do not have to be defined.

(Method 2)

The instructions to the user equipment UE on the transition to the DRX mode and the initiation of the different frequency measurement are represented in a single control signal, and this single control signal is transmitted to the user equipment UE in an explicit manner. What is transmitted is the same as method 1, but method 2 differs from method 1 in that a new signal is provided. Header information or control information in a MAC layer or RRC measurement control may be used for the transmission to the user equipment UE.

(Method 3)

In methods 1 and 2, it is explicitly indicated that the operating mode of the user equipment UE is to be changed. However, if the user equipment UE has not communicated in a shared channel for longer than or equal to a predefined period, the operating mode is switched to the DRX mode. Thus, in method 3, the instruction on the initiation of the different frequency measurement is transmitted to the user equipment in an explicit manner similar to methods 1 and 2, but the instruction on the transition to the DRX mode is not explicitly transmitted. After the base station apparatus eNB transmits the instruction on the initiation of the different frequency measurement, the base station apparatus eNB does not assign resources for the shared channel to the user equipment UE. As a result, the user equipment UE can transition to the DRX mode after passage of a predefined period.

Figure 5:
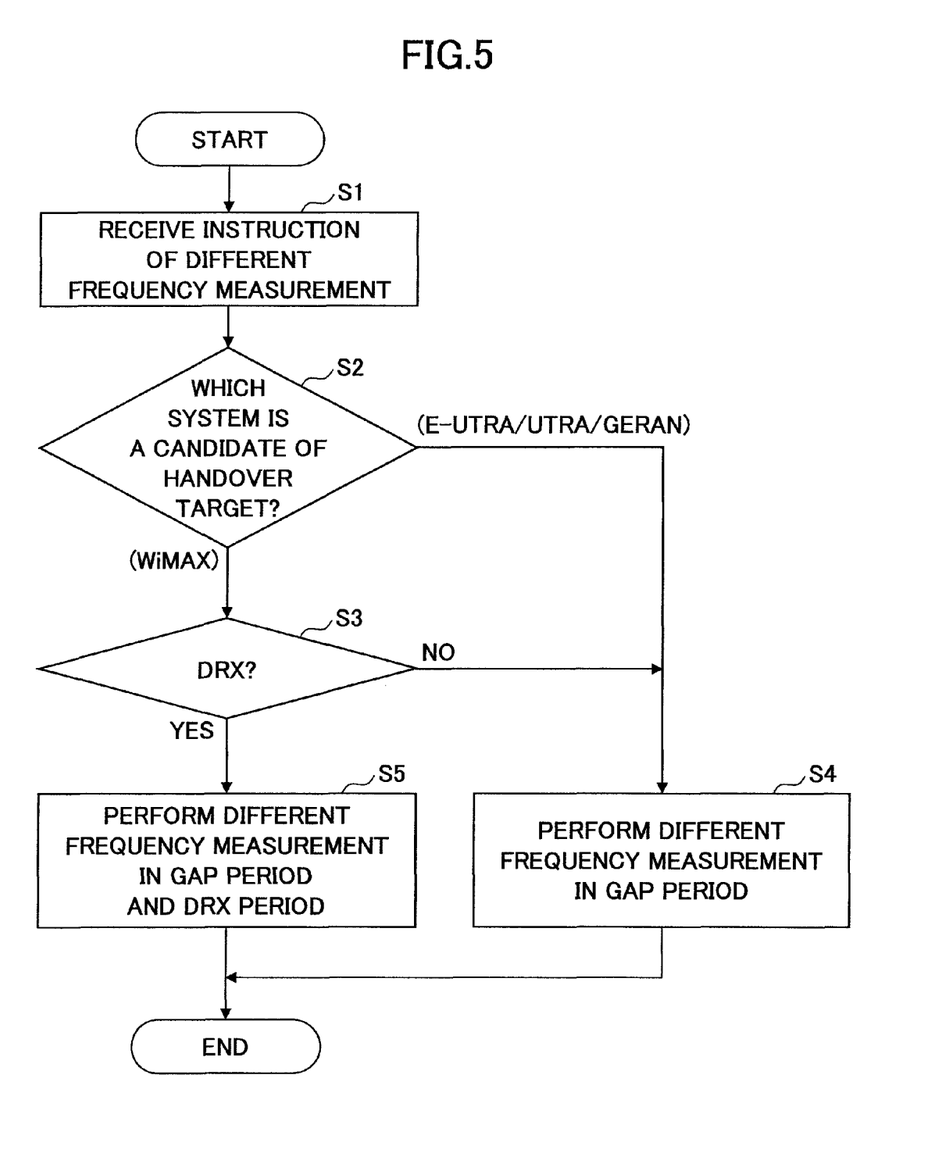
FIG. 5 is a flowchart illustrating an exemplary operation of a user equipment.

FIG. 5 illustrates an operation flow of a user equipment according to one embodiment of the present invention. At step S1, the user equipment UE is instructed by the base station apparatus eNB to conduct the different frequency measurement. This instruction is issued at step S2 or S3 in FIG. 4.

At step S2 in FIG. 5, it is determined which of a LTE (E-UTRA) based system, a WCDMA (UTRA) based system, a GSM (GERAN) based system or a WiMAX based system the candidate handover target corresponds to. If the candidate handover target corresponds to the LTE (E-UTRA) based system, the WCDMA (UTRA) based system or the GSM (GERAN) based system, the flow proceeds to step S4.

The case of the flow proceeding to step S4 corresponds to the case where step S2 in FIG. 4 has been conducted. Thus, the user equipment UE searches for a cell at an indicated frequency and measures the quality of the cell in the system specified gap period of 6 ms.

On the other hand, if it is determined at step S2 that the candidate handover target corresponds to the WiMAX based system, the flow proceeds to step S3. At step S3, it is determined whether the operating mode of the user equipment UE is the DRX mode. As stated above, the instruction on the transition to the DRX mode may be explicitly transmitted (methods 1 and 2) or may not be explicitly transmitted (method 3). In the former case, it is determined at step S3 whether the explicit instruction on transition of the operating mode of the user equipment UE to the DRX mode is transmitted. In the latter case, it is determined whether the operating mode of the user equipment UE has been already transitioned to the DRX mode. In any case, if the operating mode of the user equipment UE is to be transitioned or has been transitioned to the DRX mode, the flow proceeds to step S5.

At step S5, both the gap period and the DRX period are available for the different frequency measurement. The DRX period used herein may mean a period other than On-duration. Alternatively, the DRX period may mean a period corresponding to inactive time in discontinuous reception control. During these periods, the user equipment UE searches for a cell in the WiMAX based system and measures quality of the cell. In this case, the different frequency measurement is not the optimized measurement method. This differs from the measurement method at step S4 where the optimized different frequency measurement is conducted. Note that the optimized measurement method for the optimum different frequency measurement may be implemented in a high-end mobile station.

At steps S4 and S5, in order to eliminate the effects of instantaneous fading, several results of the different frequency measurement are preferably averaged. Based on the measurement results, the quality of the candidate handover target (e.g., reception level or SINR) is derived.

The reception level may be referred to as RSRP (Reference Signal Received Power). Also, RSRQ (Reference Signal Received Quality) may be used as the quality of candidate handover targets instead of the above-mentioned reception level and SINR. The RSRQ is a quotient of reception power of downlink reference signals divided by downlink RSSI (Received Signal Strength Indicator). The RSSI is a total reception level observed at a mobile station and corresponds to the reception level including all the factors such as thermal noise, interference power from other cells and power of desired signals from the own cell.

If this quality meets a predefined handover condition, the user equipment informs the base station eNB that the quality meets the predefined handover condition. The predefined handover condition may include a condition (quality in a different frequency cell)+(offset)>(threshold) and a condition (quality in a different frequency cell)+(offset)>(quality in a serving (own frequency) cell). Note that determination on one or both of the above-mentioned conditions may be made. When the base station apparatus eNB has found occurrence of an event where the conditions are satisfied, the base station apparatus eNB instructs the user equipment UE to initiate handover to a candidate cell in a handover command. In response to this instruction, the user equipment initiates the handover procedure to the different frequency cell. The different frequency cell means a cell in the LTE based system, the WCDMA based system or the GSM based system in the step S4 and a cell in the WiMAX based system in step S5.

[Apparatus Arrangement]

Figure 6:
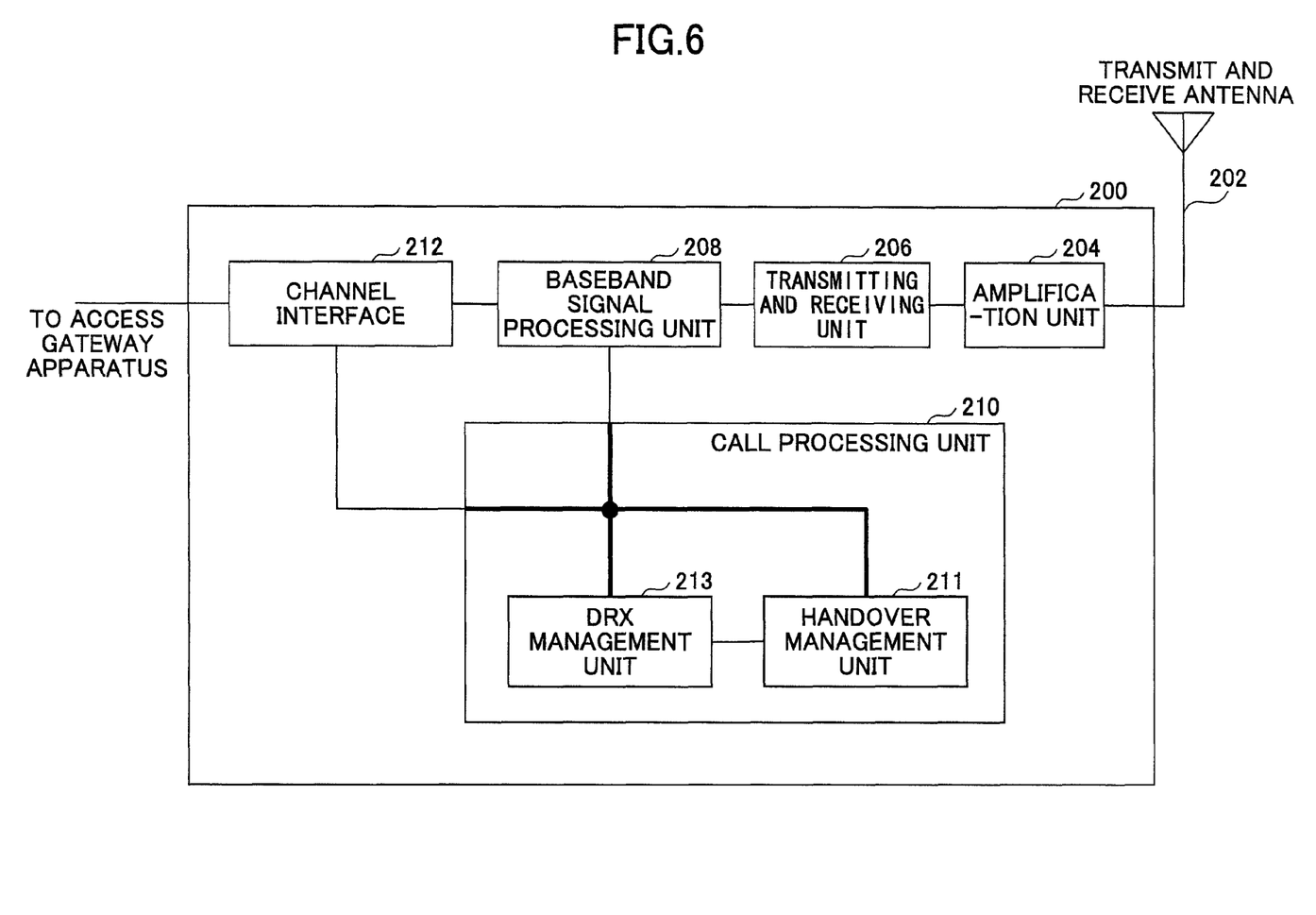
FIG. 6 is a partial functional block diagram illustrating a base station apparatus.

FIG. 6 is a partial functional block diagram illustrating a base station apparatus. A base station apparatus 200 includes a transmit and receive antenna 202. The base station apparatus 200 includes an amplification unit 204. The base station apparatus 200 includes a transmitting and receiving unit 206. The base station apparatus 200 includes a baseband signal processing unit 208. The base station apparatus 200 includes a call processing unit 210. The call processing unit 210 includes a handover management unit 211. The call processing unit 210 includes a DRX management unit 213. The base station apparatus 200 includes a channel interface 212.

In downlinks, user data is supplied from an upper station (e.g., an access gateway apparatus) to the baseband signal processing unit 208 via the channel interface 212. The access gateway apparatus may be referred to as a MME/SGW (Mobility Management Entity/Serving Gateway).

The baseband signal processing unit 208 performs some operations such as PDCP layer transmission operations, RLC layer transmission operations including segmentation and/or concatenation of user data and RLC (Radio Link Control) retransmission control, MAC (Medium Access Control) retransmission control (e.g., HARQ), scheduling, transmission format selections, channel encoding and IFFT (Inverse Fast Fourier Transform). In the case where the above-mentioned method 3 is employed, when the different frequency measurement is to be conducted, it is prevented to assign radio resources to a target user equipment. The resulting signals are supplied to the transmitting and receiving unit 206. Downlink control channels are also subjected to transmission operations such as the channel encoding and the IFFT and supplied to the transmitting and receiving unit 206.

The transmitting and receiving unit 206 conducts frequency conversion to map baseband signals supplied from the baseband signal processing unit 208 into radio frequency signals, and the resulting signals are amplified in the amplification unit 204 and transmitted from the transmit and receive antenna 202.

In uplinks, the base station apparatus 200 receives radio frequency signals via the transmit and receive antenna 202. The received radio frequency signals are amplified in the amplification unit 204, frequency-converted into baseband signals in the transmitting and receiving unit 206 and supplied to the baseband signal processing unit 208.

The baseband signal processing unit 208 performs FFT/IDFT operations, error correction decoding, reception operations for MAC retransmission control, RLC layer and PDCP layer reception operations on user data in the supplied uplink baseband signals and transmits the resulting signals to the access gateway apparatus via the channel interface 212. Also, uplink control channels are subjected to the FFT/IDFT operations, error correction decoding, reception operations for MAC retransmission control and the RLC layer reception operations.

The call processing unit 210 performs call operations such as establishing and releasing communication channels, state management of the radio base station 200 and radio resource management.

The handover management unit 211 performs operations such as determination as to whether a candidate handover target of the user equipment UE corresponds to a predefined system and determination as to whether to initiate handover. In one embodiment of the present invention, the predefined system means the LTE based system, the WCDMA based system or the GSM based system. More generally, the predefined system means a system where the gap period (6 ms in the above-mentioned example) defined in a system for a serving cell is the same as the optimum gap period for the different frequency measurement. Also, another predefined system different from the predefined system may be the WiMAX based system, for example. More generally, that system means a system where the gap period (6 ms in the above-mentioned example) defined in a system for a serving cell is different from the optimum gap period for the different frequency measurement (e.g., 10 ms if the different frequency measurement is conducted for a WiMAX based cell).

The DRX management unit 213 has normal functions of managing the discontinuous period in the DRX mode (DRX cycle), On-duration timer and the duty ratio and determining as to whether to transition to the DRX mode as well as a function of transitioning the user equipment to the DRX mode in a predefined case. The predefined case corresponds to the case where the handover management unit 211 detects another predefined system (cell) different from the predefined system (cell) and typically corresponds to the case where a candidate handover target is the WiMAX based system.

In the case of the above-mentioned method 1, for example, upon determining to transition the user equipment UE to the DRX mode, the DRX management unit 213 sends the user equipment UE a control signal for indicating the user equipment UE to transition to the DRX mode. The control signal is transmitted to the user equipment UE via the baseband signal processing unit 208, the transmitting and receiving unit 206, the amplification unit 204 and the transmit and receive antenna 202.

In the case of the above-mentioned method 2, for example, upon determining to transition the user equipment to the DRX mode, the DRX management unit 213 sends the user equipment UE a control signal for indicating the user equipment to transition to the DRX mode and initiate the different frequency measurement. The control signal is transmitted to the user equipment UE via the baseband signal processing unit 208, the transmitting and receiving unit 206, the amplification unit 204 and the transmit and receive antenna 202.

Figure 7:
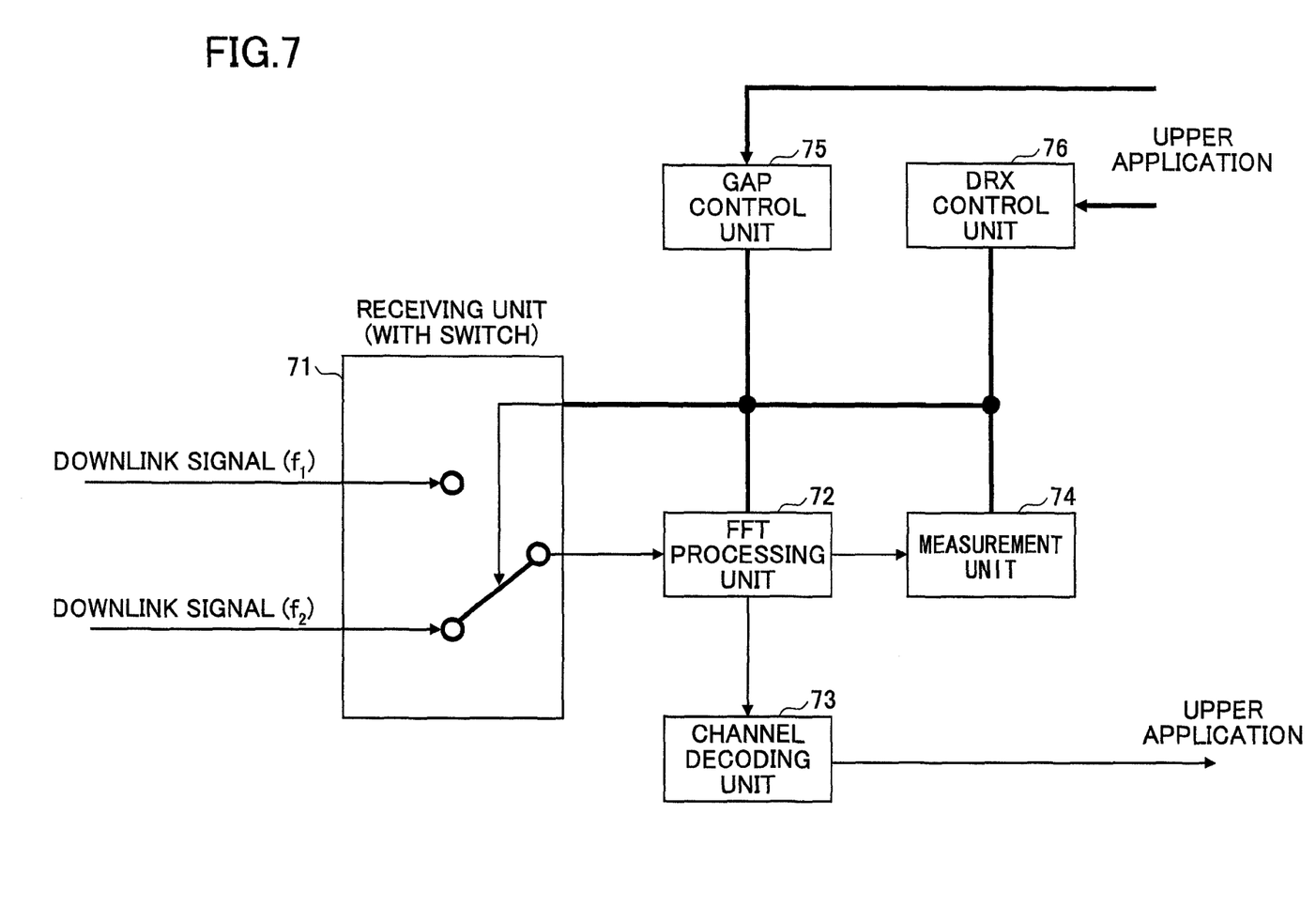
FIG. 7 is a partial functional block diagram illustrating a user equipment.

FIG. 7 is a partial functional block diagram illustrating a user equipment UE. The user equipment UE includes a receiving unit 71. The user equipment UE includes a FFT processing unit 72. The user equipment UE includes a channel decoding unit 73. The user equipment UE includes a measurement unit 74. The user equipment UE includes a gap control unit 75. The user equipment UE includes a DRX control unit 76.

The receiving unit 71 receives radio frequency signals at a frequency indicated by the base station apparatus eNB and converts them into baseband signals.

The FFT processing unit 72 performs fast Fourier transform on the received signals and extracts various signals mapped to frequency domains. Among the extracted signals, for example, reference signals (pilot signals) are supplied to the measurement unit 74. Among the extracted signals, for example, data channels and control channels are supplied to the channel decoding unit 73. Also, the FFT processing unit 72 sends the measurement unit 74 received signals that have not been fast Fourier transformed.

The channel decoding unit 73 performs error correction decoding on data channels and control channels in the received signals and transmits the resulting signals to a subsequent stage demodulation processing unit.

The measurement unit 74 searches for a target cell for the different frequency measurement based on the received signals that have not been fast Fourier transformed. Also, the measurement unit 74 measures reception quality of reference signals of the cell detected in the cell search. The reception quality may be represented in the reception level or the reception SINR, for example.

The gap control unit 75 sets gap periods in accordance with control signals supplied from the base station apparatus eNB. A start time, a length and a cycle of the gap period, a frequency of a different frequency measured target and others are indicated in MAC layer header information or control information and/or RRC messages such as RRC measurement control. The indicated frequency is transmitted to the receiving unit 71. In synchronization with the start and end timings of the gap period, a tuning frequency of the receiving unit 71 may be switched between a serving cell frequency and a different frequency of a different frequency measurement target cell.

The DRX control unit 76 changes the operating mode into the DRX mode in accordance with explicit instructions from the base station apparatus eNB or determination by the user equipment UE. Particularly, if the WiMAX based system corresponds to a candidate handover different frequency system, not only the gap period but also the DRX period are available for the different frequency measurement. In other words, the receiving unit 71 may be synchronized with a different frequency not only in the gap period but also in the DRX period. In this case, the measurement unit 74 conducts the different frequency measurement not only in the gap period but also in the DRX period. The DRX period may mean a period other than the On-duration in the discontinuous reception control. Alternatively, the DRX period may mean a period not being active time in the discontinuous reception control.

In the above-mentioned embodiment, when the different frequency measurement target cell is a cell different from the predefined cell and the base station eNB signals the user equipment UE to initiate the different frequency measurement and transition to the DRX mode, the user equipment may or may not be explicitly instructed to search for a cell and measure quality of the cell by using both the gap period and the DRX period. If the user equipment UE is explicitly instructed, the user equipment UE uses both the gap period and the DRX period to perform the cell search and cell quality measurement. On the other hand, if the user equipment UE is not explicitly instructed, the base station eNB simply signals the user equipment UE to initiate the different frequency measurement and transition to the DRX mode. In this case, the user equipment UE determines whether to use only the gap period or both the gap period and the DRX period for the cell search and the cell quality measurement.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. Separation of the embodiments or items are not essential to the present invention, and descriptions in two or more embodiments or items may be combined as needed. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2007-313964 filed on Dec. 4, 2007, the entire contents of which are hereby incorporated by reference.

The invention claimed is:

1. A base station apparatus for use in a mobile communication system, comprising:
   a determination unit configured to determine whether to cause a user equipment residing in a cell of the base station apparatus to conduct different frequency measurement; and
   a transmitting unit configured to transmit a control signal to the user equipment, wherein
   if a candidate handover target cell of the user equipment is a predefined cell, the control signal indicates to the user equipment to conduct the different frequency measurement in a gap period defined in the mobile communication system, and
   if the candidate handover target cell of the user equipment is another predefined cell different from the predefined cell, the control signal indicates to the user equipment to conduct the different frequency measurement and enter a discontinuous reception operating mode in the gap period defined in the mobile communication system.

2. The base station apparatus as claimed in claim 1, wherein if the candidate handover target cell of the user equipment is another predefined cell different from the predefined cell, the control signal indicates to the user equipment to conduct the different frequency measurement and enter the discontinuous reception operating mode in separate messages.

3. The base station apparatus as claimed in claim 1, wherein if the candidate handover target cell of the user equipment is another predefined cell different from the predefined cell, the control signal indicates to the user equipment to conduct the different frequency measurement and enter the discontinuous reception operating mode in a same message.

4. The base station apparatus as claimed in claim 1, wherein if the candidate handover target cell of the user equipment is another predefined cell different from the predefined cell, it is prevented to assign a radio resource to the user equipment, and an operating mode of the user equipment transitions to the discontinuous reception operating mode without explicit instruction by the base station apparatus to the user equipment.

5. The base station apparatus as claimed in claim 1, wherein the control signal is transmitted in MAC layer header information or control information or a RRC message.

6. The base station apparatus as claimed in claim 1, wherein the control signal for indicating to the user equipment to conduct the different frequency measurement indicates a length and an arrival cycle of the gap period and a frequency for the different frequency measurement.

7. The base station apparatus as claimed in claim 1, wherein the discontinuous reception operating mode has a discontinuous period longer than the gap period.

8. The base station apparatus as claimed in claim 1, wherein the predefined cell comprises a LTE based system cell, a WCDMA based system cell or a GSM based system cell, and the other predefined cell comprises a WiMAX based system cell.

9. A method for use in a base station apparatus in a mobile communication system, comprising:
   determining whether to cause a user equipment residing in a cell of the base station apparatus to conduct different frequency measurement; and
   transmitting a control signal to the user equipment, wherein
   if a candidate handover target cell of the user equipment is a predefined cell, the control signal indicates to the user equipment to conduct the different frequency measurement in a gap period defined in the mobile communication system, and
   if the candidate handover target cell of the user equipment is another predefined cell different from the predefined cell, the control signal indicates to the user equipment to conduct the different frequency measurement and enter a discontinuous reception operating mode in the gap period defined in the mobile communication system.

10. A user equipment for use in a mobile communication system, comprising:
    a reception unit configured to receive a control signal from a base station apparatus of a camped cell; and
    a cell search and quality measurement unit configured to conduct cell search at a frequency indicated by the base station apparatus and cell quality measurement, wherein
    if a candidate handover target cell of the user equipment is a predefined cell, the reception unit receives the control signal indicating to the user equipment to conduct the different frequency measurement in a gap period defined in the mobile communication system, and
    if the candidate handover target cell of the user equipment is another predefined cell different from the predefined cell, the reception unit receives the control signal indicating to the user equipment to conduct the different frequency measurement and enter a discontinuous reception operating mode in the gap period defined in the mobile communication system.

11. The user equipment as claimed in claim 10, wherein an indication to enter the discontinuous reception operating mode and an indication to conduct the different frequency measurement are represented in separate control signals.

12. The user equipment as claimed in claim 10, wherein both an indication to enter the discontinuous reception operating mode and an indication to conduct the different frequency measurement are represented in the single control signal.

13. The user equipment as claimed in claim 10, wherein in response to no communication in a shared channel for longer than or equal to a predefined period, the user equipment transitions to the discontinuous reception operating mode and conducts the different frequency measurement between discontinuous signal receptions in the discontinuous reception operating mode.

14. The user equipment as claimed in claim 10, wherein the control signal is transmitted in MAC layer header information or control information or a RRC message.

15. The user equipment as claimed in claim 10, wherein the control signal for indicating to the user equipment to conduct the different frequency measurement indicates a length and an arrival cycle of the gap period and a frequency for the different frequency measurement.

16. The user equipment as claimed in claim 10, wherein the discontinuous reception operating mode has a discontinuous period longer than the gap period.

17. The user equipment as claimed in claim 10, wherein the predefined cell comprises a LTE based system cell, a WCDMA based system cell or a GSM based system cell, and the other predefined cell comprises a WiMAX based system cell.

18. A method for use in a user equipment in a mobile communication system, comprising:
    receiving a control signal from a base station apparatus of a camped cell; and
    conducting cell search at a frequency indicated by the base station apparatus and cell quality measurement, wherein if a candidate handover target cell of the user equipment is a predefined cell, the receiving comprises receiving the control signal indicating to the user equipment to conduct the different frequency measurement in a gap period defined in the mobile communication system, and if the candidate handover target cell of the user equipment is another predefined cell different from the predefined cell, the receiving comprises receiving the control signal indicating to the user equipment to conduct the different frequency measurement and enter a discontinuous reception operating mode in the gap period defined in the mobile communication system.

19. A mobile communication system including a base station apparatus and a user equipment,
wherein the base station apparatus comprises a determination unit configured to determine whether to cause a user equipment residing in a cell of the base station apparatus to conduct different frequency measurement and a transmitting unit configured to transmit a control signal to the user equipment,
wherein the user equipment comprises a reception unit configured to receive the control signal from a base station apparatus of a camped cell and a cell search and quality measurement unit configured to conduct cell search at a frequency indicated by the base station apparatus and cell quality measurement,
wherein if a candidate handover target cell of the user equipment is a predefined cell, the control signal allows the user equipment to conduct the different frequency measurement in a gap period defined in the mobile communication system, and if the candidate handover target cell of the user equipment is another predefined cell different from the predefined cell, the control signal allows the user equipment to conduct the different frequency measurement in the gap period defined in the mobile communication system and between discontinuous signal receptions in the discontinuous reception operating mode.

20. A method for use in a mobile communication system including a base station apparatus and a user equipment, comprising:
the base station apparatus determining whether to cause a user equipment residing in a cell of the base station apparatus to conduct different frequency measurement;
the base station apparatus transmitting a control signal to the user equipment;
the user equipment receiving the control signal from the base station apparatus; and
conducting cell search at a frequency indicated by the base station apparatus,
wherein if a candidate handover target cell of the user equipment is a predefined cell, the control signal allows the user equipment to conduct the different frequency measurement in a gap period defined in the mobile communication system, and if the candidate handover target cell of the user equipment is another predefined cell different from the predefined cell, the control signal allows the user equipment to conduct the different frequency measurement in the gap period defined in the mobile communication system and between discontinuous signal receptions in the discontinuous reception operating mode.

* * * * *